United States Patent
Samak Sangari et al.

(10) Patent No.: US 9,969,131 B2
(45) Date of Patent: May 15, 2018

(54) AUTOMATED PLY LAYUP SYSTEM

(75) Inventors: Samra Samak Sangari, Seattle, WA (US); Kurtis S. Willden, Kent, WA (US); James M. Cobb, Burien, WA (US); Gary M. Buckus, Bothell, WA (US); Carlos Crespo, Lynnwood, WA (US); Samuel F. Pedigo, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 467 days.

(21) Appl. No.: 13/166,306

(22) Filed: Jun. 22, 2011

(65) Prior Publication Data

US 2012/0330453 A1 Dec. 27, 2012

(51) Int. Cl.
| | |
|---|---|
| *B32B 37/14* | (2006.01) |
| *B29C 70/38* | (2006.01) |
| *B25J 9/16* | (2006.01) |
| *B25J 13/08* | (2006.01) |
| *B25J 15/00* | (2006.01) |
| *B25J 15/06* | (2006.01) |
| *B25J 19/02* | (2006.01) |

(52) U.S. Cl.
CPC .............. *B29C 70/38* (2013.01); *B25J 9/1697* (2013.01); *B25J 13/085* (2013.01); *B25J 15/0085* (2013.01); *B25J 15/0616* (2013.01); *B25J 19/022* (2013.01); *B25J 19/023* (2013.01); *Y10T 156/10* (2015.01)

(58) Field of Classification Search
CPC ....................................................... B32B 37/14
USPC ................................................. 700/117, 118
See application file for complete search history.

(56) References Cited

U.S. PATENT DOCUMENTS

| | | | |
|---|---|---|---|
| 5,183,670 A | 2/1993 | Trudeau | |
| 5,209,804 A | 5/1993 | Trudeau | |
| 5,290,386 A * | 3/1994 | Trudeau | ....................... 156/350 |
| 5,876,550 A | 2/1999 | Feygin | |
| 6,131,973 A | 10/2000 | Trudeau et al. | |
| 7,341,086 B2 | 3/2008 | Nelson et al. | |
| 7,386,367 B2 * | 6/2008 | Watanabe et al. | ............ 700/259 |
| 7,766,063 B2 | 8/2010 | Lauder | |
| 8,125,758 B2 | 2/2012 | Pelrine et al. | |
| 2005/0209735 A1 * | 9/2005 | Groppe | ................... B29C 70/32 700/245 |

(Continued)

FOREIGN PATENT DOCUMENTS

| | | |
|---|---|---|
| DE | 202007006528 U1 | 9/2008 |
| DE | 102007061431 A1 | 6/2009 |

(Continued)

OTHER PUBLICATIONS

Shoureshi et al., "Vision-Based Intelligent Control for Automated Assembly" Journal of Intelligent and Robotic Systems vol. 2. Kluwer Academic Publishers, 1989 pp. 153-170.*

(Continued)

*Primary Examiner* — Emilio J Saavedra
(74) *Attorney, Agent, or Firm* — Yee & Associates, P.C.

(57) ABSTRACT

An automated ply layup system uses a robot and an end effector for selecting plies from a kit and placing the plies at predetermined locations on a tool by further employing cameras for ply location detection, a laser scanner for detection and ply placement within a location on the tool, and compact sensors for compacting plies onto the tool.

2 Claims, 8 Drawing Sheets

(56) References Cited

U.S. PATENT DOCUMENTS

| | | | |
|---|---|---|---|
| 2006/0090856 A1* | 5/2006 | Nelson et al. | 156/510 |
| 2006/0260751 A1* | 11/2006 | Lauder et al. | 156/382 |
| 2007/0271064 A1 | 11/2007 | Walton | |
| 2008/0071417 A1* | 3/2008 | Rice | H01L 21/67724 700/213 |
| 2009/0199948 A1* | 8/2009 | Kisch | B29C 70/38 156/64 |
| 2009/0320292 A1 | 12/2009 | Brennan | |
| 2010/0007065 A1 | 1/2010 | Reinhold et al. | |
| 2010/0178139 A1 | 7/2010 | Sundar et al. | |
| 2010/0271746 A1* | 10/2010 | Pelrine et al. | 361/234 |

FOREIGN PATENT DOCUMENTS

| | | |
|---|---|---|
| DE | 102008032574 A1 | 1/2010 |
| DE | 102010044721 A1 | 3/2012 |
| EP | 1857260 A1 | 11/2007 |
| EP | 1992456 A2 | 11/2008 |
| JP | S62104740 A | 5/1987 |
| JP | 2009148858 A | 9/2009 |
| JP | 2009202251 A | 9/2009 |
| JP | 2011251525 A | 12/2011 |
| WO | WO2012031723 A1 | 3/2012 |

OTHER PUBLICATIONS

Ruth et al., "Robotic Lay-Up of Prepeg Composite Plies" IEEE International Conference on Robotics and Automation, 1990. Proceedings, vol. 2 May 13-18, 1990. pp. 1296-1300.*

Olsen et al., "Automated Composite Tape Lay-Up Using Robotic Devices" Proceedings, IEEE International Conference on Robotics and Automation. vol. 3, May 2-6, 1993. pp. 291-297.*

Chestney et al., "Dielectric Selection for a Robotic Electrostatic Gripping Device" IEE Conference Publication No. 430 of 7th International Conference on Dielectric Materials Measurements & Applications, Sep. 23-24, 1996, pp. 103-107.*

Shirinzadeh et al., "Fabrication process of open surfaces by robotic fibre placement" Robotics and Computer-Integrated Manufacturing, vol. 20, 2004. pp. 17-28.*

Monkman et al., Robot Grippers. Wiley-VCH Verlag GnmbH & Co. 2007. Chapters 1 and 5.*

Schmitt et al., "In-process 3D laser measurement to control the fiber tape-laying for composite production" Conference proceedings SPIE 7723, Optics, Photonics, and Digital Technologies for Multimedia Applications, vol. 7723 (May 4, 2010) pp. 1-9.*

Ruth et al., "Robotic Lay-up of Prepreg Composite Plies" Proceedings 1990 IEEE International Conference on Robotics and Automation, May 13, 1990-May 18, 1990, vol. 2 pp. 1296-1300.*

Leeper et al., "Using Near-Field Stereo Vision for Robotic Grasping in Cluttered Environments" Proceedings of ISER 2010. Dec. 2010. pp. 1-15.*

"Aircraft Lightning Strike Protection" Dexmet Corporation, Dec. 26, 2010, https://web.archive.org/web/20101226022612/http://www.dexmet.com/Aircraft-Lightning-Strike-Protection.html.*

International Search Report and Written Opinion, dated Nov. 28, 2012, regarding Application No. PCT/US2012/038139, 23 pages.

Hosoda et al., "Adaptive Hybrid Visual Servoing/Force Control in Unknown Environment," Proceedings of the 1996 IEEE/RSJ International Conference on Intelligent Robots and Systems (IROS 96), vol. 3, Nov. 1996, pp. 1097-1103.

Nelson et al., "Integrating Force and Vision Feedback Within Virtual Environments for Telerobotic Systems," Proceedings of the 1997 IEEE International Conferences on Robotics and Automation, Apr. 1997, 1588-1593.

Canadian Intellectual Property Office Communication, dated Feb. 26, 2015, regarding Application No. 2,832,229, 3 pages.

State Intellectual Property Office of PRC Notification of First Office Action and English Translation, dated Apr. 17, 2015, regarding Application No. 201280030394.4, 19 pages.

State Intellectual Property Office of PRC Notification of Second Office Action and English Translation, dated Sep. 18, 2015, regarding Application No. 201280030394.4, 10 pages.

European Examination Report, dated Feb. 12, 2016, regarding Application No. 12724465.5, 9 pages.

Notices of Reasons for Rejection and English Translation, dated Mar. 1, 2016, regarding Japanese Patent Application No. 2014-516972, 7 pages.

European Examination Report, dated Sep. 19, 2016, regarding Application No. 12724465.5, 4 pages.

Notices of Reasons for Rejection and English Translation, dated May 6, 2016, regarding Chinese Patent Application No. 201280030394.4, 7 pages.

* cited by examiner

AUTOMATED PLY LAYUP SYSTEM

TECHNICAL FIELD

The present disclosure generally relates to the fabrication of laminated structures, especially those formed of composites, and deals more particularly with a system for automated layup of plies on a tool.

BACKGROUND

During the fabrication of large scale laminate structures, a group of plies arranged as a kit may be sequentially laid up at particular locations on a tool in order to strengthen, stiffen or otherwise provide a structure with desired structural or performance characteristics. The use of a ply kit may be efficient in some applications since it frees automated tape laying equipment from laying up many relatively small plies in localized areas. Ply kits may be used, for example and without limitation, where it is desirable to fill gaps between stringers and frames of an airframe using a composite filler. The filler comprises a set of laminated filler plies that are sequentially placed on a tool before full plies are laid up over the filler. The filler plies may be placed within pockets in the tool that are specially shaped and located to form a shaped filler when the pocket is filled with plies. In the past, the layup process was performed by hand.

Hand layup techniques may be required in other applications. For example, it may be necessary to layup plies, such as doublers in precise locations on a substrate relative to each other. Using hand layup techniques, the technician must place each individual ply on the substrate at a precise location relative to other plies. Moreover, the hand layup technique requires placement of plies one-at-a-time, and the size of the plies is limited to that which the technician can manually handle. In other applications, hand layup may be necessary where the ply material is relatively delicate and/or subject to wrinkling, creasing or tearing when processed by AFP machines. For example, protection of aircraft against lightning strikes may be achieved by applying a grid of thin copper foil-sheets to exterior skins of the aircraft. The grids are assembled by one-at-a-time by hand layup of hundreds of pieces of relatively small thin copper foil sheets that may be subject to wrinkling, denting, creasing and/or tearing during the layup process.

The hand layup techniques described above are time consuming, labor intensive and may not be well suited to higher production environments. Accordingly, there is a need for an automated layup system that reduces hand labor and layup time, and provides reliable precise placement of material plies on a substrate such as a tool. There is also a need for a layup process that allows placement of larger plies in order to reduce the total number plies that need to be laid up to form a structure.

SUMMARY

The disclosed embodiments provide an automated layup system that is well suited for laying up groups of plies, such as kitted fillers, doublers as well as other types of plies for a variety of applications. The process of selecting a desired ply in sequence from a ply kit, transferring the selected ply to a tool and placing the ply at the correct location on the tool is performed automatically by a robotically controlled end effector. The end effector optically recognizes the correct ply to be lifted from the kit and detects features on the tool that are used to locate the ply during ply placement and compaction. The system may reduce or eliminate ply wrinkling and may provide more precise control of the layup process. A variety of plies may be picked up and placed by the end effector such as, without limitation thermoplastics, prepregs, metal foils and adhesive layers, to name a few. The end effector may be employed to pre-inspect a localized area of a tool before the plies are placed on the tool or to post inspect the placed ply to ensure proper alignment.

According to one disclosed embodiment, a system is provided for laying composite plies at preselected locations. An end effector on a robot lifts a ply and places the ply at a preselected location. A device is provided for recording the position of the ply on the end effector, and a controller coupled with the recording device controls the robot and the end effector to place the ply. The end effector may include a vacuum operated gripper for gripping the ply when it is lifted in preparation for placement. The recording device may include a stationary camera for viewing the ply on the end effector. The system may further comprise a camera on the end effector coupled with the controller for viewing the ply before it is lifted by the end effector, and the controller may include software for recognizing and selecting the ply from a plurality of plies. The system may also include a detector on the end effector for detecting the location of features at the placement location that are used to adjust the placement of the ply. In one embodiment, the detector may comprise a 3-D laser scanner. The end effector on the robot is used to apply a compaction force to the ply as it is being placed, and the system further comprises a sensor on the end effector for sensing the amount of the compaction force.

According to another embodiment, a system is provided for automatically laying up plies on a substrate. The system comprises an end effector for placing each of the plies on the substrate, and a robot for manipulating the end effector. A detector is provided on the end effector for detecting features on the tool. A controller coupled with the detector on the robot controls the end effector to place the ply on the substrate at a location based on the detected features on the substrate. In one embodiment, the detector is a laser scanner adapted for scanning the surface of the substrate. The system may further comprise a camera on the end effector for recording an image of the ply before the ply is lifted, and a controller may include object recognition software for recognizing the image recorded by the camera. The system may further comprise a camera for recording an image of the ply on the end effector, wherein the controller is operative for determining the position of the ply on the end effector after being lifted.

According to still another embodiment, a method is provided of laying up plies at predetermined locations on a substrate. The method comprises picking up a ply, moving the ply to an area adjacent a predetermined location on a substrate, orienting the ply relative to the predetermined location where the ply is to be placed, and placing the ply at the predetermined location on the substrate. An end effector is used to pick up the ply, and move it to an area adjacent the substrate. The end effector is used to detect features on the substrate representing a predetermined location where the ply is to be placed. The end effector is also used to place the ply on the substrate based on detected features. Picking up the ply may include gripping the ply on the end effector by holding the ply against the end effector with a vacuum. Moving the end effector to the area adjacent the tool is performed using automatically controlled robotic manipulator. Using the end effector to detect features on the substrate includes using a non-contact scanner to scan the surface of the substrate. The method may further comprise using the end effector to compact the ply against the substrate, and using a sensor on the end effector to sense the compaction force applied by the end effector to the ply.

According to a further embodiment, a method is provided of fabricating a composite aircraft structure. The method comprises providing a plurality of composite plies and using a robotically controlled end effector to pick up one of the plies. The method also includes determining the position of the ply on the end effector and using the end effector to move the ply to the area of the tool. The end effector is used to place the ply on the tool based on the position of the ply on the end effector. The end effector may also be used to identify the ply to be picked up.

According to still another embodiment, a method of reducing the time required to fabricate a multi-ply composite structure comprises using an automatically controlled tape layup machine to layup courses of composite tape forming plies on a tool, and using a robotically controlled end effector to place plies on local areas of the tool.

According to still another embodiment, a method is provided of laying up a ply on a substrate, comprising using an electroadhesive gripper to grip the ply, and placing the gripped ply on the substrate. Using the electroadhesive gripper to grip the ply includes adhering the ply to the gripper by generating an electrostatic adhesive force between the gripper and the ply. Placing the gripped ply on the substrate includes using a robotic manipulator to move the gripped ply into contact with the substrate, and releasing the ply from the electroadhesive gripper. Releasing the ply includes removing the electrostatic adhesive force between the gripper and the ply. Generating an electrostatic adhesive force includes generating electrostatic fields on the gripper, and using the electrostatic fields to induce electrostatic charges on the ply.

According to still another embodiment, a method is provided of laying up plies of conductive metal foil on an aircraft skin. The method comprises using an end effector to pick up the plies, including using an electrostatic adhesive force to grip the plies, and moving the end effector to an area on the skin. The method further comprises using the end effector to place the plies on the skin. Placing the plies on the skin includes releasing the electrostatic adhesive force gripping the plies on the end effector. Gripping the plies includes generating electrostatic fields on the gripper, and using the electrostatic fields to induce electrostatic charges on the ply.

According to still another embodiment, a system is provided for laying up plies on a substrate, comprising an end effector including an electrostatic gripper for releasably gripping the plies using an electrostatic adhesive force, and a robotic manipulator for manipulating the end effector. The system further comprises a programmed controller for automatically controlling the operation of the robotic manipulator and the electrostatic gripper. The electrostatic gripper includes a plurality of alternating positive and negative electrode pads adapted to be coupled with a source of electrical power. The gripper includes a backing plate, and the electrode pads are located on the backing plate. A polymeric coating protectively covering the electrode pads. The system further comprises a device for recording the position of the ply on the end effector, and a detector on the end effector for detecting features on the substrate where the plies are to be laid up.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
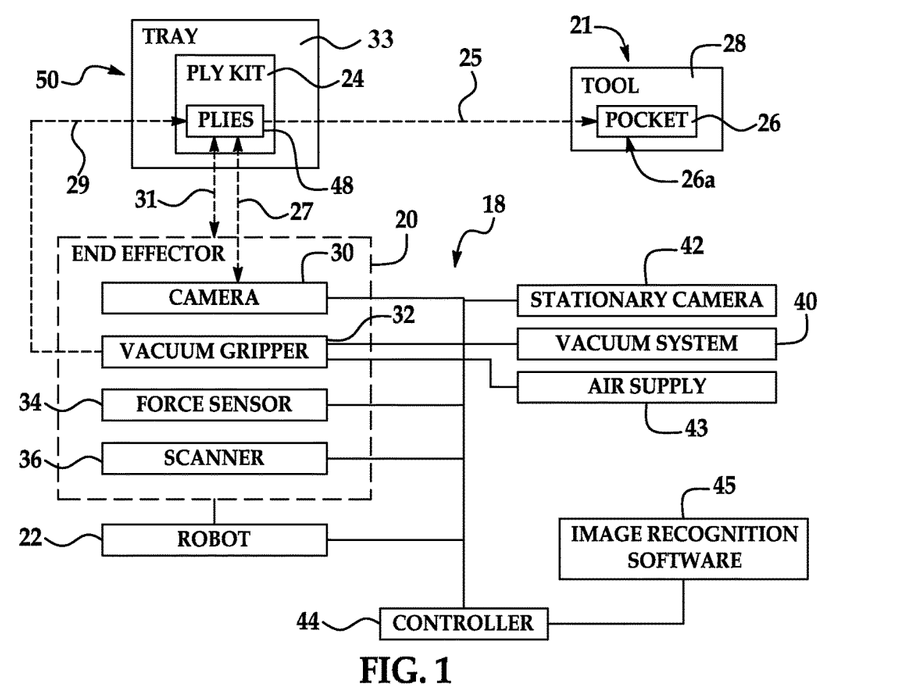
FIG. 1 is an illustration of a functional block diagram of an automated ply layup system according to the disclosed embodiments.

Referring first to FIG. 1, the disclosed embodiments relate to an automated ply layup system generally indicated by the numeral 18 that automatically places 25 plies 48 on a substrate 21 such as a tool 28 or a previously placed ply (not shown) on the tool 28. The plies 48 may form part of a ply kit 24 comprising a preselected number of plies 48 having the same or different fiber orientations that are intended to be laid up on the tool 28 in a predetermined sequence to form a feature such as a doubler (not shown) or a filler (not shown) on a composite structure (not shown). The plies 48 are placed 25 at specific locations on the tool 28 during the layup process. In the illustrated embodiment, the plies 48 are sequentially placed 25 in one or more pockets 26 in the tool. While layup of composite plies 48 is described in the illustrated examples, the disclosed embodiments may be employed to layup or place other objects, and especially those in the form of flexible or non-flexible sheet-like or flat materials, including without limitation, plastics, ceramics and metals and composites in various forms, which may be electrically conductive or non-conductive. Accordingly, the term "ply" as used herein is intended to include a wide variety of shapes and materials.

The automated ply placement system 18 broadly comprises an end effector 20 mounted on a robot 22 or similar automatically controlled manipulator, a stationary camera 42 and a controller 44. The end effector 20 comprises a scanner 36, a camera 30, a vacuum gripper 32 and a force sensor 34. The camera 30 functions to record images of the plies 48 in the kit 24 which are processed by image recognition software 45 forming part of the controller 44 to recognize and select 27 individual plies 48 in the proper layup sequence. The vacuum gripper 32 may be coupled with a vacuum system 40 and functions to releasably grip 29 individual plies 48 in order to hold 29 the ply 48 on the end effector 20 until ready for placement 25 on the tool 28. The vacuum gripper 32 may also be connected to a pressurized air supply 43. The air supply 43 may be used to apply positive pressure to the ply 48 which may aid in releasing the ply 48 after its placement. The end effector 20 may be equipped with other types of ply grippers, as will be discussed below.

The scanner 36 may comprise, for example and without limitation, a 2-D or 3-D laser scanner which scans the surface of the tool 28 to identify the location of features such as pockets 26. In applications where the end effector 22 is used to compact 31 plies 48 against the tool 28, the force sensor 34 on the end effector 20 functions to sense the amount of compaction force being applied to the ply 48. This sensed compaction force is fed back to a controller 44 which may respond by adjusting the compaction force applied by the robot 22. The stationary camera 42 functions to record an image of a ply 48 gripped by the end effector which is used by the controller 44 to determine the position, i.e. placement and/or orientation, of the ply 48 on the end effector 20. The end effector 20 and the robot 22 are coupled with the controller 44 which receives inputs from the scanner 36, camera 30, force sensor 34 and the stationary camera 42 and functions to control the operation of the end effector 20 and robot 22.

In use, the robot 22 moves the end effector 20 to a work cell 50 where the tray 33 is located so that the plies 48 in the ply kit 24 are within the field-of-view of the camera 30. Using image recognition software 45, the controller 44 recognizes and selects 27 the next ply 48 to be laid up on the tool 28. In some embodiments, the camera 30 may record images within the work cell 50 that reflect other information such as the size and/or shape of one or more of the plies 48. In other embodiments, the end effector 20 may include other sensing equipment, such as, without limitation, an RFID (radio frequency identification) reader (not shown) that senses information useful in connection with selection and/or placement of plies 48 that may be stored in an RFID tag (not shown) or other device.

Based on the ply selection 25, the end effector 20 uses the vacuum gripper 32 to lift and hold 29 the selected ply 48 on the end effector 20 while the robot 22 moves the selected ply to a location that is within the field-of-view of the stationary camera 42. The stationary camera 42 functions as a device for recording the position (placement and/or orientation) of the ply 48 on the end effector 20 by recording an image of the ply 48 gripped by the end effector 20. The recorded image of the ply 48 is delivered to the controller 44 which uses the recorded image to determine the position of the ply 48 on the end effector 20. The controller 44 then translates the recorded position of the ply 48 into the 3-D spatial coordinate system 54 (FIG. 2) used by the robot 22, by applying offsets to the recorded position of the ply 48 or using other techniques.

The robot 22 moves the end effector 20 from the stationary camera 42 to a location in the area of the tool 28, typically facing the tool 28. The scanner 36 on the end effector 20 is then used to scan the tool 28 to identify features such as pocket 26 that may be used to determine the location where the selected ply is to be placed on the tool 28. In the present example, the scanner 36 may be used to locate the edges 26a (see FIG. 4) of the pocket 26. The location of the edges 26a is used by the controller 44 to control the robot 22 which moves the end effector 20 until the selected ply 48 is positioned to place the ply 48 at the desired location on the tool 28, which in the illustrated example, corresponds to a pocket 26. The end effector 20 then places 25 the selected ply 48 on the tool 28 within the pocket 26, aligned with edges 26a or with other features of the pocket 26. The end effector 20 then compacts 31 the ply 48 against the tool 28 with a desired amount of force which is measured by the force sensor 34 on the end effector 20. The scanner 36 on the end effector 20 may also be used to pre-inspect localized areas of the tool 28 prior to ply placement, as well as to perform a post inspection of the plies 48 and/or the tool 28 after the plies 48 have been placed to verify that laid up features such as doublers and fillers are correctly located on the tool 28 and/or in relation to other layup features. Pre-inspection of the tool 28 may be desirable where variations may occur in the location of certain tool features. For example, and without limitation, variations may occur in the exact location of the pockets 26, from tool-to-tool, due to original tool manufacturing tolerances and/or due to rework or maintenance of the tool during its life-cycle. Thus use of the scanner 36 on the end effector 20 allows the actual (measured) location of the pockets 26 on a particular tool 28 to be determined, in contrast to relying on the nominal (as-designed) location of the pockets 26 as the basis for ply placement location.

As previously mentioned, the amount of force applied by the robot 22 to compact 31 the ply 48 is controlled by the controller 44, using the force measured by the force sensor 34 as a feedback signal. Once the ply 48 has been placed 25 and compacted 31, the vacuum gripper 32 releases the ply 48 and the end effector 20 moves away from the tool 28, back to the work cell 50 in order to pickup the next-in-sequence ply 48 in the kit 24. The air supply 43 may be used to effect positive release of the ply 48 from the gripper 32 before the end effector moves away from the tool 28.

Figure 2:
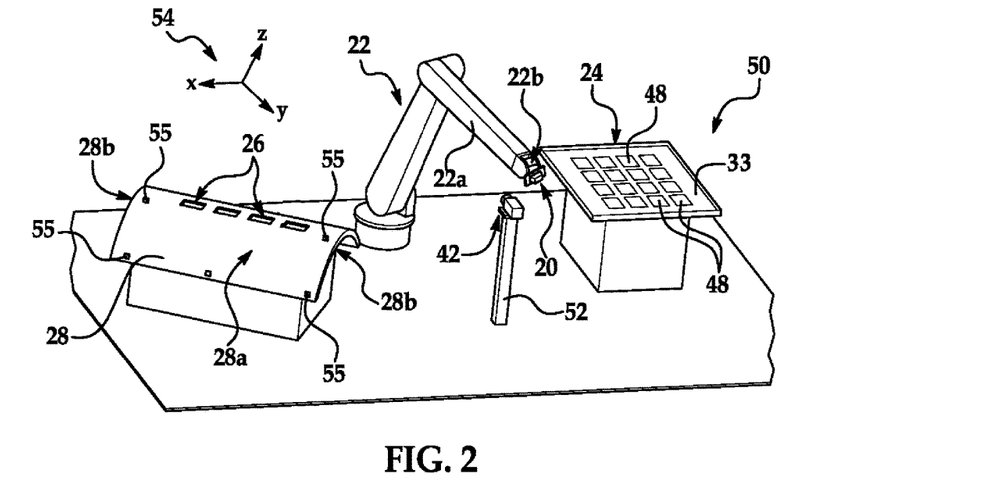
FIG. 2 is an illustration of a perspective view of the automated ply layup system shown in FIG. 1.

FIG. 2 illustrates one typical implementation of the automated ply layup system 18 shown in FIG. 1. The numeral 54 designates the 3-D spatial coordinate system used by the robot 22 to lift, transport and place the plies 48 at the desired locations on the tool 28. The robot 22 may comprise any suitable automated manipulator, including but not limited to conveyors and transporters, but in the illustrated embodiment is depicted as being an articulated type having an articulating arm 22a which may assist in orienting a ply 48 with a location on the tool 28 during the placement process. The arm 22a is provided with a rotatable wrist 22b to which the end effector 20 is mounted. The robot 22 has a reach extending from the work cell 50 to the tool 28 from which the plies 48 are to be laid up. In the illustrated example, the ply kit 24 comprises an array of plies 48 placed on a removable tray 33, with the plies 48 facing upwardly and within reach of the robot 22.

The stationary camera 42 is mounted on a support 52, between the work cell 50 and the tool 28, however other locations of the camera 42 are possible. Placement of the camera 42 between the work cell 50 and the tool 28 allows the robot 22 to move the ply 48 into the field-of-view of the camera 42 as the robot 22 pivots and the end effector 20 swings in an arc from the work cell 50 to the tool 28. The camera 42 may comprise any suitable imaging device capable of producing a digital image of the ply 48 lifted by the end effector 20. In some embodiments, the use of more than one camera 42 may be desirable.

In the illustrated example, the tool 28 is depicted as a curved mandrel having a plurality of aligned pockets 26 in the tool surface 28a. One or more optical reflectors 55 may be placed on the surface 28a of the tool 28 to aid in the approximate positioning of the end effector 20 over the tool 28 prior to the ply 48 being placed. The reflectors 55 may be detected by the laser scanner 36 (FIG. 1), however the laser scanner 36 may sense other features of the tool 28 for the purpose of approximately positioning the end effector 20, such as detecting the edges 28b of the tool 28.

Figure 3:
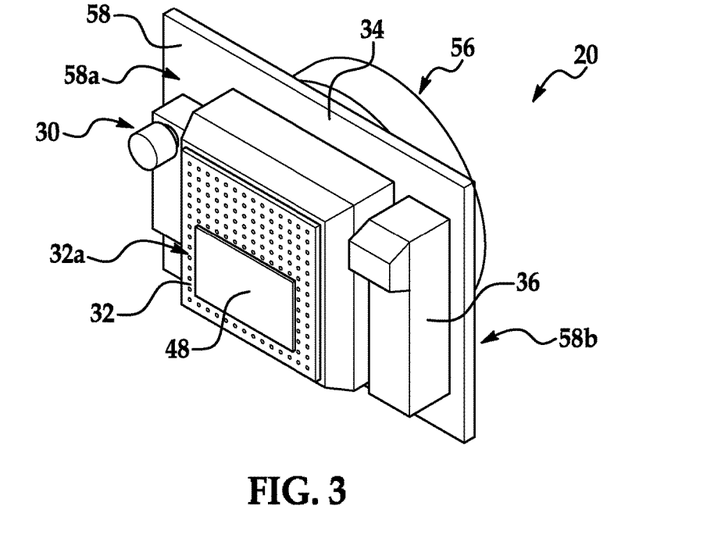
FIG. 3 is an illustration of a perspective view of the end effector forming part of the system shown in FIGS. 1 and 2.

FIG. 3 illustrates additional details of the end effector 20. The laser scanner 36, vacuum gripper 32 and camera 30 are mounted on one face 58a of a mounting plate 58. The vacuum gripper 32 may include a perforated face 32a that is coupled with the vacuum system 40 (FIG. 1) and is adapted to hold a ply 48 thereon. The perforated face 32a may also be coupled with the air supply 43 shown in FIG. 1 to allow positive air pressure to be applied to the ply 48 when it is being released from the gripper 32. The force sensor 34 is mounted on the opposite face 58b of the plate 58 and may comprise, for example and without limitation, a piezoelectric device. An adapter 56 secured to the plate 58 adapts the end effector 20 to be coupled with the wrist 22b of the robot 22.

Figure 4:
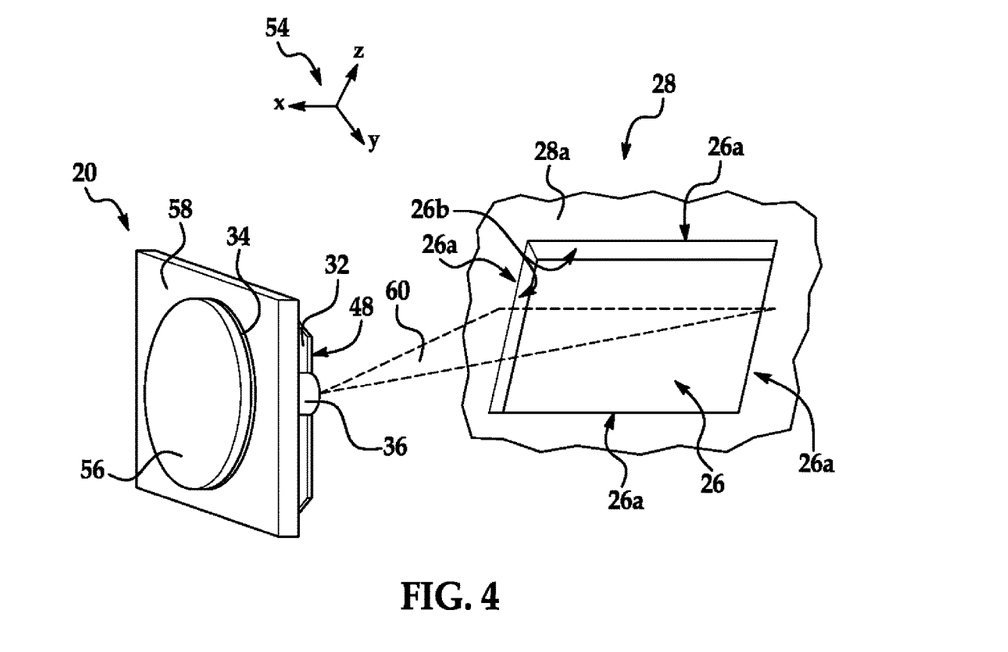
FIG. 4 is an illustration of a perspective view showing the end effector scanning the surface of the tool to identify features of a tool pocket.

FIG. 4 illustrates the end effector 20 having been approximately positioned above one of the pockets 26 in the tool 28, in preparation for placing a ply 48 in the pocket 26. In this example, the pocket 26 may include inclined side walls 26a. The laser scanner 36 is used to scan 60 the pocket 26a to determine its location on the tool 28 and within the 3-D spatial coordinate system 54. As previously noted, the laser scanner 36 may be of the 3-D scanning type which generates a three dimensional model of the pocket 26 that includes the inclined sidewalls 26b as well as the edges 26a of the pocket 26. Based on a 3-D model of the pocket 26 generated by the laser scanner 36, the controller 44 (FIG. 1) may control movement of the end effector 20 to precisely place the ply 48 within the boundaries of the pocket 26, aligned with the edges 26a of the pocket 26.

Figure 5:
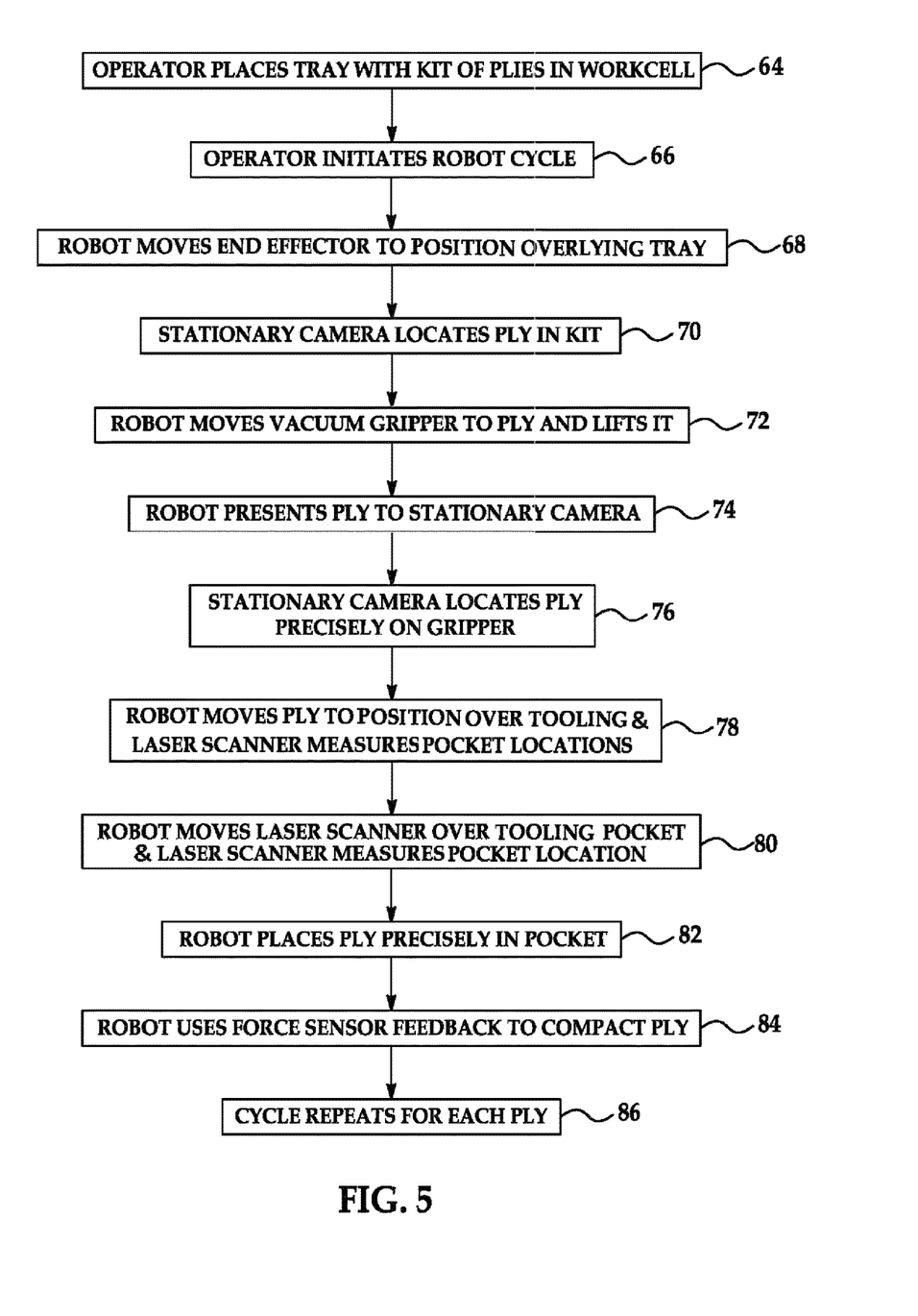
FIG. 5 is an illustration of a flow diagram of a method for automated layup of filler plies.

Attention is now directed to FIG. 5 which illustrates the overall steps of an automated method of laying up plies 48, such as filler plies. Beginning at step 64, an operator places a tray 33 with a kit 24 of plies 48 at a work cell 50. Next, at 66, the operator initiates a robot cycle using the controller 44. At step 68, the robot 22 moves the end effector 20 to a position overlying the tray 33 at the work cell 50. At 70, the camera 30 on the end effector 20 selects 27 a particular ply 48 in the kit 24 that is next-in-sequence to be laid up. At 72, the robot 22 moves the vacuum gripper 48 into contact with the selected ply 48, thereby gripping 29 the ply 48 and lifting it as the robot 20 moves the end effector 20 away from the work cell 50 and toward the stationary camera 42. At step 74, the robot 22 presents the selected 27 ply 48 to the stationary camera 42 which records an image showing the position of the ply 48 relative to the end effector 22. At 76, the stationary camera 42, in cooperation with the controller 44, locates the ply 48 within the 3-D coordinate reference system 54 of the robot 22.

At step 78, the robot 22 moves the selected ply 48 to a position over the tooling 28 and the laser scanner 36 measures the approximate location of the pockets 26 by detecting the reflectors 35 or detecting other features such as the edges 28b of the tooling 28. Next, at 80, the robot 22 moves the laser scanner 36 into proximity with a pocket 26 and the scanner 36 then scans the pocket 26, as previously discussed in connection with FIG. 4. With the precise location of the pocket 26 known within the 3-D coordinate reference system 54, the robot 22 then places 25 the ply 48 precisely in the pocket 26, as shown in step 82, either on the tool 28 or on a ply 48 that has been previously placed in the pocket 26. At 84, the force sensor 34 is used to develop a feedback signal during the compaction process which is used by a controller 44 to determine the amount of force to be applied to the ply 48 by the robot as it is being compacted 29 on the tool 28. Positive air pressure may be applied to the ply 48 by the air supply 42 (FIG. 1) in order to assure that the ply 48 is released from the gripper 32. As shown at 86, steps 66-84 are repeated for each of the plies 48 in sequence until the filler has been completed.

Figure 6:
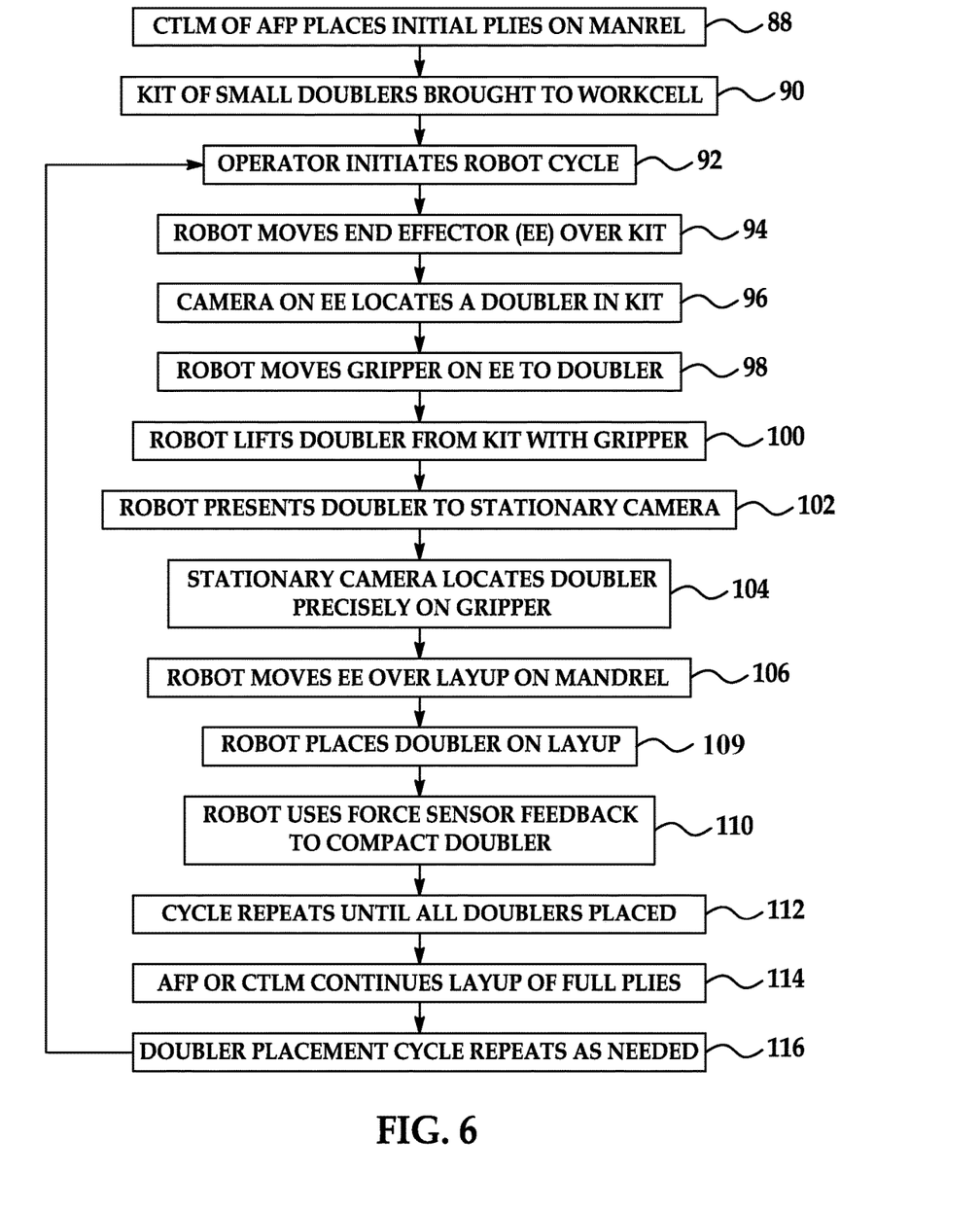
FIG. 6 is an illustration similar to FIG. 5 but showing a method for automated layup of doubler plies.

FIG. 6 illustrates the overall steps of a method for automated layup of ply doublers. Beginning at step 88 a composite tape layup machine or an automated fiber placement machine (not shown) places the initial plies on a mandrel such as the tool 28 shown in FIG. 2. Next, at 90, a kit of doubler plies 48 is placed in the work cell 50. At step 92, an operator initiates a robot cycle, and at 94, the robot 22 moves the end effector 20 over the kit 30. At step 96, the camera 30 locates and selects 27 the next-in-sequence doubler ply 48 in the kit 30. At 98, the robot 22 then moves the vacuum gripper 32 on the end effector 20 into contact with the doubler ply 48 and at 100, the robot 22 lifts the selected doubler ply 48 from the kit 30 using the vacuum gripper 32. At step 102, the robot 22 presents the doubler ply 48 to the stationary camera 42 and at 104, the stationary camera 42 locates the doubler ply 48 precisely on the face 32a of the vacuum gripper 32.

At 106, the robot 22 moves the end effector 20 to a position over the mandrel tool 28, and the laser scanner 36 may be used to detect features that are used to determine the exact location where the doubler ply 48 is to be placed. The detected features may comprise, without limitation, reflectors 55 on the tool 28, the edges 28b of the tool 28, or the edges (not shown) of a previously placed ply 48 At 109, the robot 22 places 25 the doubler ply 48 on the tool surface 28a or on an already placed doubler ply 48. At 110, the robot 22 uses the force sensor 34 to provide feedback to the controller 44 indicating the amount of compaction force that is being applied to the doubler ply 48 during the compaction process 29. At 112, steps 92-110 are repeated until all of the doubler plies 48 have been placed on the mandrel tool 28. At 114, the composite tape layup machine or the automated fiber placement machine continues the layup process of full plies over the doubler plies 48, and at 106, the placement of doubler plies 48 is repeated, as needed or as dictated by a predetermined ply schedule.

Figure 7:
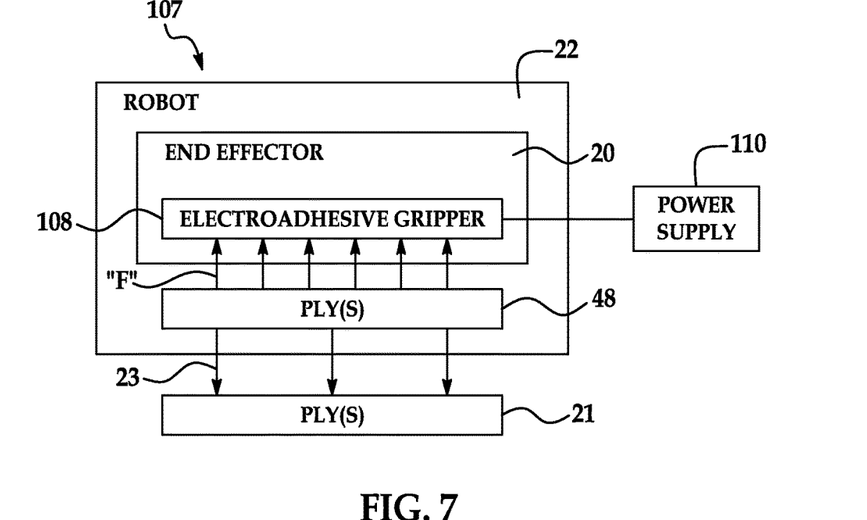
FIG. 7 is an illustration of a functional block diagram of apparatus for laying up plies.

Attention is now directed to FIG. 7 which broadly illustrates apparatus 107 that may be used in an automated ply layup system, such as the system 54 shown in FIG. 2. The apparatus 107 may be used to pick up and transport plies 48, and place 23 them on a substrate 21, such as a tool 28 (FIG. 2), a previously laid ply 48, or other substrates (not shown). The apparatus 107 comprises an end effector 20 manipulated by a robot 22 which may be similar to that previously described in connection with FIGS. 1-3. The end effector 20 includes an electroadhesive gripper 108 that uses reversible electrostatic adhesion to grip one or more plies 48 on the end effector 20 while being transported and placed on the tool 28. The electroadhesive gripper 108 is powered by an electrical power supply 110 and generates an electrostatic adhesive force "F" that is used to releasably adhere the ply(s) 48 to the end effector 20.

Figure 8:
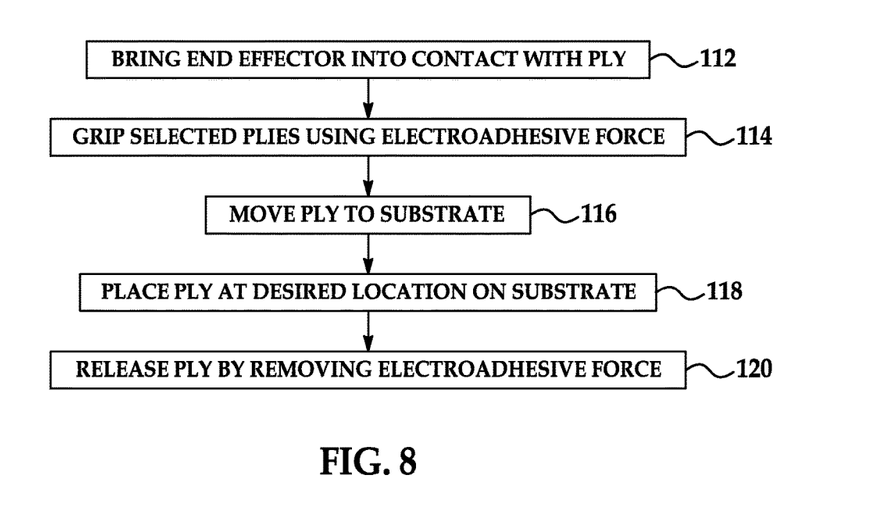
FIG. 8 is an illustration of a flow diagram of a method of laying up plies using the apparatus shown in FIG. 7.

FIG. 8 broadly illustrates the steps of a method of laying up plies 38 using the apparatus 107 shown in FIG. 7. Beginning at 112, the end effector 20 is brought into contact with one or more plies 48, such as those shown in FIG. 1 forming part of a ply kit 24 on a tray 33. At 114 the plies 48 are picked up and gripped by the gripper 108 using an electrostatic adhesive force "F" which adheres the plies to the gripper 108. At 116, the end effector 20 and robot 22 move the gripped ply 48 to a substrate 21 such as the tool 28 shown in FIG. 2. At step 118 the end effector 20 is used to place 23 the ply 48 at a desired location on the substrate 21. For example, the end effector 20 may place ply 48 in one of the pockets 26 of the tool 28 shown in FIG. 2. At step 120, the ply 48 is released from the end effector 20 after being placed 23 in step 118, by removing the electrostatic adhesive force "F" which adheres the ply to the gripper 108. The electrostatic adhesive force "F" is removed by turning off electrical power supplied to the gripper 108.

As previously mentioned, the apparatus 107 shown in FIG. 7 and the method illustrated in FIG. 8 may be used in an automated layup system 50 shown in FIG. 1, wherein cameras 30, 42 are used to recognize, sequentially select and pick up plies 48 for layup as well as to determine the orientation of plies on an end effector 20 prior to being placed. However, the apparatus 107 shown in FIG. 7 and the method illustrated in FIG. 8 may be employed in other automated layup systems in which an end effector 20 manipulated by a robot 22 is used to automatically place plies 48 on a substrate 21.

Figure 9:
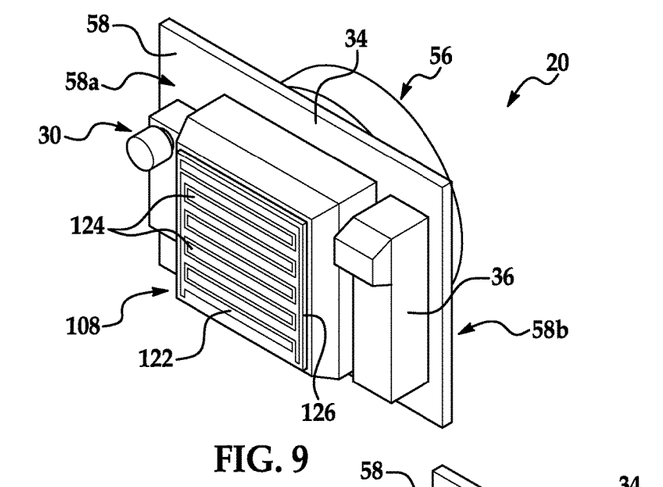
FIG. 9 is an illustration of a perspective view of the end effector forming part of the apparatus shown in FIG. 7.
Figure 10:
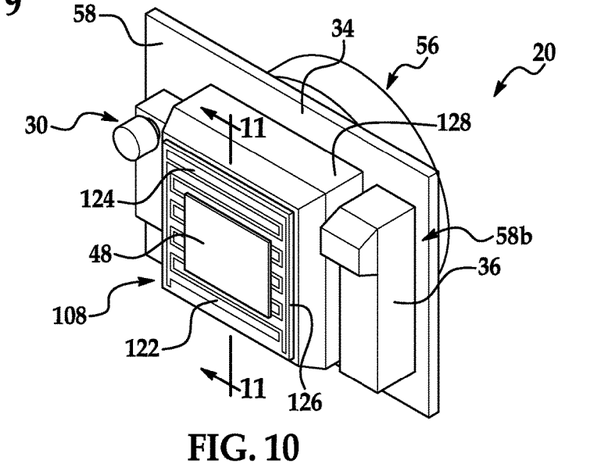
FIG. 10 is an illustration of a perspective view similar to FIG. 9, but showing a ply having been picked up and gripped by the end effector.

FIGS. 9 and 10 illustrate additional details of one embodiment of the apparatus shown in FIG. 7. The electroadhesive gripper 108 comprises a plurality of alternating positive and negative elongate electrode pads 122, 124 respectively. The electrode pads 122, 124 may comprise spaced apart, substantially parallel strips of electrically conductive material, such as without limitation, copper or other suitable metals. The electrode pads 122, 124 extend across and are supported on a backing plate 126 mounted on an extension 128 on the end effector 20. The positive and negative electrode pads 122, 124 respectively are respectively coupled to the electrical power supply 110 (FIG. 7) which may be a DC power supply that may be located on-board or off-board the end effector 20. In the illustrated example, the backing plate 126 and the electrode pads 122, 124 are substantially flat, however they may have other geometries, including simple or complex contours, depending on the shape of the plies 48 and/or the tool 28 or other substrate 21 on which the plies 48 are to be placed.

Figure 11:
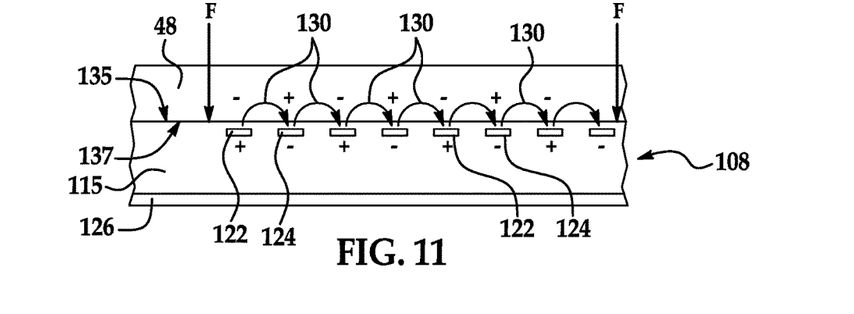
FIG. 11 is an illustration of a sectional view taken along the line 11-11 in FIG. 10.

Referring to FIG. 11, the electrode pads 122, 124 are substantially rectangular in cross section, however other electrode cross sectional geometries are possible. In the illustrated embodiment, the electrode pads 122, 124 are embedded in a clamp 115 comprising a layer of a suitable non-conductive material such as a polymer attached to the backing plate 126. The clamp 115 may comprise a substantially rigid material, or may be a somewhat deformable material that allows the surface 135 of the clamp 115 to generally conform to surface irregularities (not shown) of the gripped ply 48.

When electrical power is supplied to the electroadhesive gripper 108, the alternating positive and negative electrode pads 122, 124 generate electrostatic fields 130 that induce electrostatic + and − charges on the surface 137 of the ply 48. The polarities of the + and − charges on the ply 48 are opposite to those of the electrode pads 122, 124, resulting in generation of an electrostatic adhesion force "F" that attracts and thereby adheres the ply 48 to the surface 135 of the gripper 108. The electroadhesive gripper 108 may generate relatively large electrostatic adhesive forces "F" using relatively small amounts of power. For example, and without limitation, power requirements may be on the order of approximately 20 microwatts/Newton weight. The electrostatic adhesive force "F" may be modulated, and turned on and off by controlling the power supplied to the electrode pads 122, 124. On-off switching times may be on the order of less than approximately 50 milliseconds.

The electroadhesive gripper 108 may be used to grip conductive or non-conductive pies 48 formed of any of various materials that have rough or smooth surfaces and/or which may have dust and/or debris on the surface thereof. For example, and without limitation, the electroadhesive gripper 108 may be used to grip ply materials such as thermoplastics, prepregs, metal foils, metal and non-metal meshes and adhesive layers, to name only a few.

Figure 12:
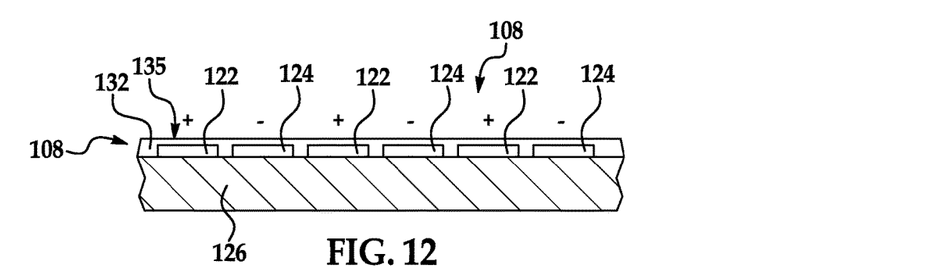
FIG. 12 is an illustration of a sectional view of an alternate embodiment of the electroadhesive gripper shown in FIG. 7.

FIG. 12 illustrates an alternate form of the gripper 108 in which the electrode pads 122, 124 are pads adhered directly to a non-conductive backing plate 126. A polymeric or other type of coating 132 protectively covers the electrode pads 122, 124. Alternatively, although not shown in the Figures, the electrode pads 122, 124 may be individually encapsulated in or surrounded by a protective coating of nonconductive material such as a polymer.

Figure 13:
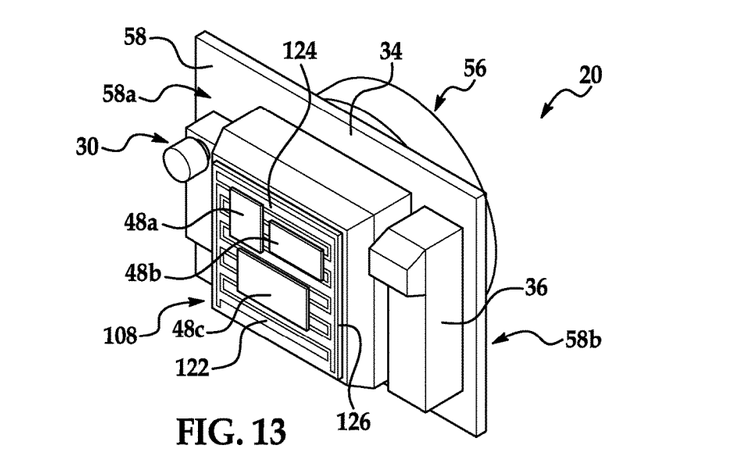
FIG. 13 is an illustration of a perspective view similar to FIGS. 9 and 10, but showing three plies gripped by the electromagnetic gripper.

As previously mentioned, the disclosed end effector 20 having an electroadhesive gripper 108 may be used to pick up, grip, transport and place a single ply 48, or as illustrated in FIG. 13, multiple plies 48a, 48b, 48c may be simultaneously picked up, gripped and placed by the end effector 20. The multiple plies 48a, 48b, 48c may be prearranged in precise relationships to each other on a tray 30 (FIG. 1) forming part of the station 50 or on other surfaces. When simultaneously gripped and picked up by the electroadhesive gripper, the plies 48a, 48b, 48c remain in their prearranged relationship while they are placed and compacted on a tool 28 or other substrate 21 by the end effector 20 as a prearranged group, in contrast to a one-at-a-time automated or hand layup placement process.

Figure 14:
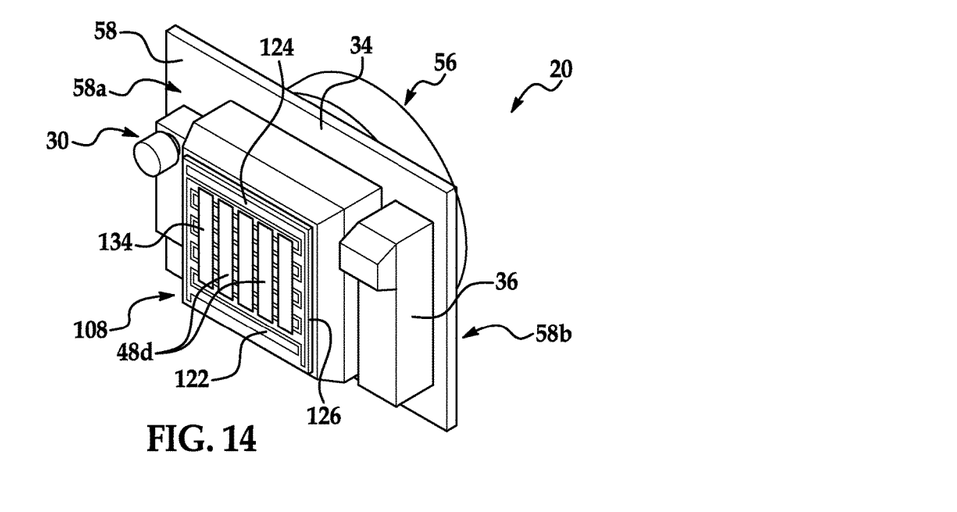
FIG. 14 is an illustration similar to FIG. 13, but showing strips of a conductive metal having been picked up by the end effector in readiness for placement on a substrate.

FIG. 14 illustrates the use of the electroadhesive gripper 108 to pick up and grip multiple strips 134 of thin metal foil which may be placed individually or as a group on a substrate 21 such as an aircraft wing (not shown) by the end effector 20. Alternatively, the previously described vacuum gripper 32 (FIG. 1) may be used on an end effector 20 to pick up and grip the metal foils strips 134. In some applications however, where lighting strike protection is implemented by applying sheets of metal mesh (not shown) to an aircraft skin (not shown), it may be preferable to use the electrostatic gripper 108 on the end effector 20.

Figure 15:
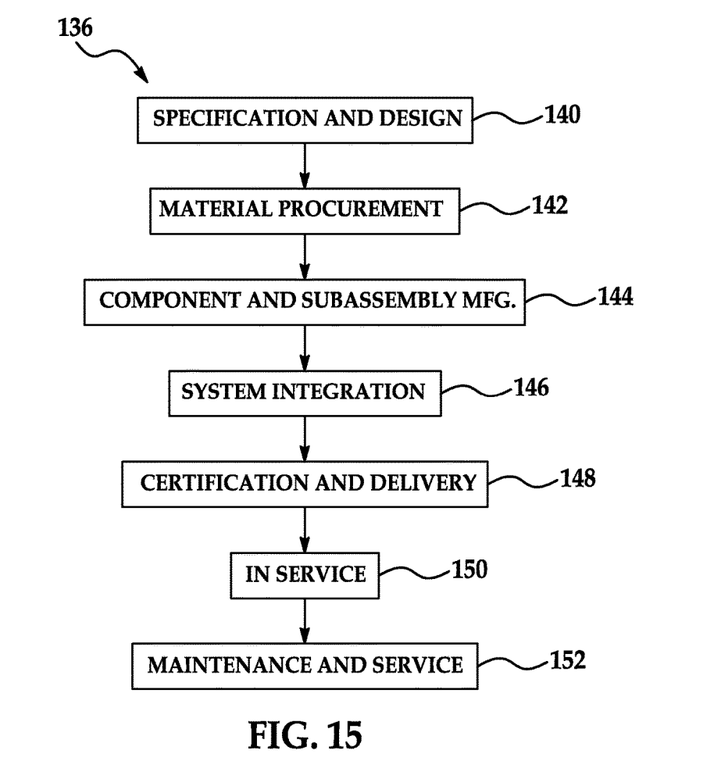
FIG. 15 is an illustration of a flow diagram of aircraft production and service methodology.
Figure 16:
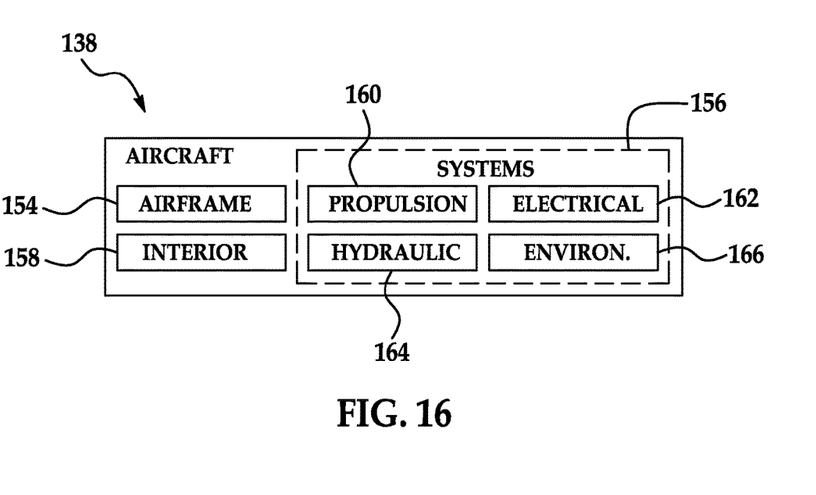
FIG. 16 is an illustration of a block diagram of an aircraft.

Embodiments of the disclosure may find use in a variety of potential applications, particularly in the transportation industry, including for example, aerospace, marine, automotive applications and other application where automated layup equipment may be used. Thus, referring now to FIGS. 15 and 16, embodiments of the disclosure may be used in the context of an aircraft manufacturing and service method 136 as shown in FIG. 15 and an aircraft 138 as shown in FIG. 16. Aircraft applications of the disclosed embodiments may include, for example, without limitation, layup of stiffened members such as fuselage skins, wing skins, control surfaces, hatches, floor panels, door panels, access panels and empennages, layup of adhesive layers and layup of thin sheets of metal foil for lightning strike applications, to name a few. During pre-production, exemplary method 136 may include specification and design 140 of the aircraft 138 and material procurement 142. During production, component and subassembly manufacturing 144 and system integration 146 of the aircraft 138 takes place. Thereafter, the aircraft 138 may go through certification and delivery 148 in order to be placed in service 150. While in service by a customer, the aircraft 138 is scheduled for routine maintenance and service 152 (which may also include modification, reconfiguration, refurbishment, and so on.

Each of the processes of method 136 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 138 produced by exemplary method 136 may include an airframe 154 with a plurality of systems 156 and an interior 158. Examples of high-level systems 156 include one or more of a propulsion system 160, an electrical system 162, a hydraulic system 164, and an environmental system 166. Any number of other systems may be included. Although an aerospace example is shown, the principles of the disclosure may be applied to other industries, such as the marine and automotive industries.

Systems and methods embodied herein may be employed during any one or more of the stages of the production and service method 136. For example, components or subassemblies corresponding to production process 144 may be fabricated or manufactured in a manner similar to components or subassemblies produced while the aircraft 110 is in service. Also, one or more apparatus embodiments, method embodiments, or a combination thereof may be utilized during the production stages 144 and 146, for example, by substantially expediting assembly of or reducing the cost of an aircraft 138. Similarly, one or more of apparatus embodiments, method embodiments, or a combination thereof may be utilized while the aircraft 138 is in service, for example and without limitation, to maintenance and service 152.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of automatically laying up plies on a tool, comprising:

providing a kit of plies to be placed in a predetermined order onto a tool wherein at least one of the plies is selected from one of filler plies, doubler plies, thermoplastics plies, prepreg plies, and metal foil plies;

using a robotically controlled end effector to select a first ply in the kit of plies and to lift the first ply from the kit of plies, including recording an image of the first ply with a first camera and using image recognition software and the recorded image to recognize the first ply from other plies in the kit of plies;

using a second camera to record an image of the first ply on the end effector, and using the image of the first ply on the end effector to determine a first position of the first ply on the end effector;

determining a second position of the first ply in a 3-D spatial coordinate system used by a robot controlling the end effector based on the first position of the first ply on the end effector;

using the end effector to move the first ply to an area of the tool;

using a 3-D laser scanner to detect features of a desired location on the tool where the first ply is to be placed, wherein the desired location comprises a pocket in the tool, the pocket having a number of edges, wherein the feature comprises one or more of the number of edges;

pre-inspecting, using the 3-D laser scanner, the desired location prior to ply placement to determine a location of the pocket on the tool and its location in the 3-D spatial coordinate system;

controlling movement of the end effector to precisely insert and place the first ply within boundaries of the pocket, and aligned with the number of edges of the pocket based on a the pre-inspection measurement by the 3-D laser scanner of the desired location, and using the end effector to compact the first ply against the tool;

wherein compacting the first ply comprises sensing a compaction force applied to the first ply during the compaction using a force sensor, and adjusting the compaction force applied to the first ply based on the compaction force sensed by the force sensor.

2. A system for automatically laying up composite plies on a tool, comprising:

a kit of plies required to be laid up on the tool in a predetermined order, wherein at least one of the plies is selected from one of filler plies, doubler plies, thermoplastics plies, prepreg plies, and metal foil plies;

an end effector;

a robot for manipulating the end effector;

a vacuum gripper on the end effector for gripping a ply and to move plies to an area of the tool;

a first camera on the end effector for recording an image of plies in the kit, wherein the end effector is used to select a first ply in the kit of plies and to lift the first ply from the kit of plies, including recording an image of the first ply with the first camera, and using image recognition software and the recorded image to recognize the first ply from other plies in the kit of plies;

a second, stationary camera for recording an image of the ply on the vacuum gripper lifted from the kit by the end effector, and using the image of the first ply on the end effector to determine a first position of the first ply on the end effector and determining a second position of the first ply in a 3-D spatial coordinate system used by a robot controlling the end effector based on the first position of the first ply on the end effector;

a laser scanner on the end effector for detecting features of a desired location on the tool where the first ply is to be placed, wherein the desired location comprises a pocket in the tool, the pocket having a number of edges, wherein the feature comprises one or more of the number of edges, and for pre-inspecting, using the laser scanner, a location prior to ply placement to determine the location of the pocket on the tool and its location in the 3-D spatial coordinate system;

a force sensor on the end effector for sensing the force applied to the ply by the end effector when the end effector places the ply on the tool; and a controller for controlling the robot, the vacuum gripper, the first and second cameras, including image recognition software for recognizing images of plies recorded by the first camera, wherein the controller is configured to control movement of the end effector to precisely insert and place the first ply within boundaries of the pocket, and aligned with the number of edges of the pocket based on a pre-inspection measurement by the laser scanner of the location, and further using the end effector to compact the first ply against the tool, wherein compacting the first ply comprises sensing a compaction force applied to the first ply during the compaction using the force sensor and adjusting the compaction force applied to the first ply based on the compaction force sensed by the force sensor.

* * * * *

UNITED STATES PATENT AND TRADEMARK OFFICE
CERTIFICATE OF CORRECTION

PATENT NO. : 9,969,131 B2  Page 1 of 1
APPLICATION NO. : 13/166306
DATED : May 15, 2018
INVENTOR(S) : Samak Sangari et al.

It is certified that error appears in the above-identified patent and that said Letters Patent is hereby corrected as shown below:

In the Claims

Column 11, Line 55, change "a tool" to -- the tool --
Column 12, Line 19, change "a the pre-inspection" to -- a pre-inspection --

Signed and Sealed this
Tenth Day of July, 2018

Andrei Iancu
*Director of the United States Patent and Trademark Office*